United States Patent
Lin et al.

(10) Patent No.: US 10,579,026 B2
(45) Date of Patent: Mar. 3, 2020

(54) BUILDING A WORKPIECE QUALITY PREDICTION MODEL

(71) Applicant: INDUSTRIAL TECHNOLOGY RESEARCH INSTITUTE, Hsinchu (TW)

(72) Inventors: Chung-Wei Lin, Zhubei (TW); Te-Ming Chen, Taipei (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 179 days.

(21) Appl. No.: 15/392,280

(22) Filed: Dec. 28, 2016

(65) Prior Publication Data

US 2018/0150038 A1 May 31, 2018

(30) Foreign Application Priority Data

Nov. 29, 2016 (TW) .............................. 105139288 A

(51) Int. Cl.
*G05B 13/04* (2006.01)
*G05B 19/41* (2006.01)
*G05B 19/418* (2006.01)

(52) U.S. Cl.
CPC ......... *G05B 13/048* (2013.01); *G05B 13/041* (2013.01); *G05B 19/41875* (2013.01); *G05B 2219/32201* (2013.01)

(58) Field of Classification Search
CPC ............ G05B 13/048; G05B 19/41875; G05B 13/041; G05B 2219/32201
See application file for complete search history.

(56) References Cited

U.S. PATENT DOCUMENTS

| 7,493,185 B2 | 2/2009 | Cheng et al. |
| 7,979,380 B2 * | 7/2011 | Moyne ................ G05B 13/048 700/28 |

(Continued)

FOREIGN PATENT DOCUMENTS

| CN | 101908495 A | 12/2010 |
| CN | 101963802 A | 2/2011 |

(Continued)

OTHER PUBLICATIONS

C. Ahilana; Somasundaram Kumananb; N. Sivakumaranc; J. Edwin Raja Dhasd, "Modeling and prediction of machining quality in CNC turning process using intelligent hybrid decision making tools", Dec. 5, 2011, Applied Soft Computing, (2013), 13, 1543-1551. (Year: 2011).*

(Continued)

*Primary Examiner* — Brian W Wathen
*Assistant Examiner* — Kelvin Booker
(74) *Attorney, Agent, or Firm* — Muncy, Geissler, Olds & Lowe, P.C.

(57) ABSTRACT

A prediction model building method for a processing machine is provided. While a workpiece is manufactured by the processing machine, a machine parameter set is generated. After the workpiece is manufactured, the workpiece is measured and a workpiece quality parameter set is generated. Then, a component status is determined according to the machine parameter set. Then, a workpiece quality prediction model in the component status is built according to the machine parameter set, the workpiece quality parameter set and the component status.

19 Claims, 6 Drawing Sheets

| workpiece no. | 1 | 1000 | 1001 | 3000 | 3001 | 4500 | 4501 | 5000 |
|---|---|---|---|---|---|---|---|---|
| $x_1$ (wear parameter) | a | a | a | a | b | b | c | c |
| $x_2$ (chipped parameter) | ii | ii | i | i | i | i | i | i |
| $x_3$ | $x_{3\_1}$ | $x_{3\_1000}$ | $x_{3\_1001}$ | $x_{3\_3000}$ | $x_{3\_3001}$ | $x_{3\_4500}$ | $x_{3\_4501}$ | $x_{3\_5000}$ |
| ⋮ | ⋮ | ⋮ | ⋮ | ⋮ | ⋮ | ⋮ | ⋮ | ⋮ |
| $x_n$ | $x_{n\_1}$ | $x_{n\_1000}$ | $x_{n\_1001}$ | $x_{n\_3000}$ | $x_{n\_3001}$ | $x_{n\_4500}$ | $x_{n\_4501}$ | $x_{n\_5000}$ |
| $y_1$ (height) | $y_{1\_1}$ | $y_{1\_1000}$ | $y_{1\_1001}$ | $y_{1\_3000}$ | $y_{1\_3001}$ | $y_{1\_4500}$ | $y_{1\_4501}$ | $y_{1\_5000}$ |
| $y_2$ (inlet diameter) | $y_{2\_1}$ | $y_{2\_1000}$ | $y_{2\_1001}$ | $y_{2\_3000}$ | $y_{2\_3001}$ | $y_{2\_4500}$ | $y_{2\_4501}$ | $y_{2\_5000}$ |
| $y_3$ (internal diameter) | $y_{3\_1}$ | $y_{3\_1000}$ | $y_{3\_1001}$ | $y_{3\_3000}$ | $y_{3\_3001}$ | $y_{3\_4500}$ | $y_{3\_4501}$ | $y_{3\_5000}$ |
| $y_4$ (ditch trail) | $y_{4\_1}$ | $y_{4\_1000}$ | $y_{4\_1001}$ | $y_{4\_3000}$ | $y_{4\_3001}$ | $y_{4\_4500}$ | $y_{4\_4501}$ | $y_{4\_5000}$ |

(56) References Cited

U.S. PATENT DOCUMENTS

| | | | | |
|---|---|---|---|---|
| 2004/0176929 | A1* | 9/2004 | Joubert | G01N 33/2888 702/184 |
| 2005/0096772 | A1* | 5/2005 | Cox | G06F 17/50 700/104 |
| 2005/0288812 | A1* | 12/2005 | Cheng | G05B 19/41875 700/109 |
| 2007/0150254 | A1* | 6/2007 | Choi | G06F 17/5009 703/22 |
| 2007/0282767 | A1* | 12/2007 | Cheng | G05B 23/024 706/15 |
| 2008/0275586 | A1* | 11/2008 | Ko | G05B 23/0221 700/110 |
| 2008/0275676 | A1* | 11/2008 | Lin | G05B 19/41875 703/2 |
| 2008/0306625 | A1* | 12/2008 | Cheng | G05B 19/41875 700/145 |
| 2009/0204267 | A1* | 8/2009 | Sustaeta | G05B 13/0285 700/291 |
| 2009/0228129 | A1* | 9/2009 | Moyne | G05B 19/41865 700/102 |
| 2009/0292386 | A1* | 11/2009 | Cheng | G05B 19/41875 700/109 |
| 2010/0332475 | A1* | 12/2010 | Birdwell | G06F 17/30333 707/737 |
| 2011/0190917 | A1* | 8/2011 | Moyne | G06F 19/00 700/103 |
| 2011/0202160 | A1* | 8/2011 | Moyne | G05B 23/0297 700/104 |
| 2011/0251707 | A1* | 10/2011 | Cheng | G05B 19/41875 700/100 |
| 2011/0282480 | A1* | 11/2011 | Jang | G05B 19/41875 700/110 |
| 2012/0049881 | A1* | 3/2012 | Johnson | G01R 31/2894 324/762.01 |
| 2013/0268469 | A1* | 10/2013 | Sharma | G06N 5/02 706/12 |
| 2013/0339919 | A1* | 12/2013 | Baseman | G05B 19/41875 716/136 |
| 2014/0107824 | A1 | 4/2014 | Zhu et al. | |
| 2014/0107828 | A1 | 4/2014 | Zhu et al. | |
| 2014/0129503 | A1* | 5/2014 | Yang | G06N 5/02 706/46 |
| 2015/0066467 | A1* | 3/2015 | Acar | G06F 17/5036 703/14 |
| 2015/0205291 | A1* | 7/2015 | Henning | G05B 19/4097 700/97 |
| 2016/0162779 | A1* | 6/2016 | Marcus | G06N 20/00 706/12 |
| 2017/0109646 | A1* | 4/2017 | David | G03F 7/705 |
| 2017/0132387 | A1 | 5/2017 | Lin et al. | |
| 2017/0322186 | A1* | 11/2017 | Su | G01N 21/88 |
| 2017/0322537 | A1* | 11/2017 | Su | B25J 9/1697 |
| 2017/0322547 | A1* | 11/2017 | Su | G05B 19/4188 |
| 2017/0322549 | A1* | 11/2017 | Su | G01N 27/00 |
| 2017/0372232 | A1* | 12/2017 | Maughan | G06F 11/30 |
| 2018/0060738 | A1* | 3/2018 | Achin | G06Q 10/04 |
| 2018/0060744 | A1* | 3/2018 | Achin | G06N 20/00 |

FOREIGN PATENT DOCUMENTS

| | | |
|---|---|---|
| CN | 102254788 A | 11/2011 |
| CN | 104657526 A | 5/2015 |
| CN | 104657526 A | 5/2015 |
| CN | 105571645 A | 5/2016 |
| CN | 103177180 B | 6/2016 |
| CN | 106682251 A | 5/2017 |
| TW | 200622526 A | 7/2006 |
| TW | 200638171 A | 11/2006 |
| TW | 200832243 A | 8/2008 |
| TW | 201019137 A | 5/2010 |
| TW | I481978 B | 4/2015 |
| TW | I521360 B | 2/2016 |
| TW | 201716178 A | 5/2017 |

OTHER PUBLICATIONS

Fahmi Arifa; Nanna Suryanaa; Burairah Hussina, "Cascade Quality Prediction Method Using Multiple PCA+ID3 for Multi-Stage Manufacturing System", 2013 International Conference on Electronic Engineering and Computer Science, IERI Procedia 4 ( 2013 ) 201-207. (Year: 2013).*

Fan-Tien Cheng, Jonathan Yung-Cheng Chang, Hsien-Cheng Huang, Chi-An Kao, Ying-Lin Chen, and Ju-Lei Peng, "Benefit Model of Virtual Metrology and Integrating AVM into MES", May 2011, IEEE Transactions on Semiconductor Manufacturing, vol. 24, No. 2. (Year: 2011).*

Fan-Tien Cheng, Hsien-Cheng Huang, and Chi-An Kao, "Developing an Automatic Virtual Metrology System", Jan. 2012, IEEE Transactions on Automation Science and Engineering, vol. 9, No. 1. (Year: 2012).*

Dražen Slišković'c, Ratko Grbi'c, Željko Hocenski, "Methods for Plant Data-Based Process Modeling in Soft-Sensor Development", 2011, Online ISSN 1848-3380 , Print ISSN 0005-1144, ATKAFF 52(4), 306-318. (Year: 2011).*

A. Ferreira, A. Roussy, L. Conde, "Virtual Metrology Models for predicting physical measurement in semiconductor manufacturing", ASMC 2009. (Year: 2009).*

Hsien-Cheng Huang, Yu-Chuan Lin, Min-HsiungHung, Chia-ChunTu, Fan-TienCheng, "Development of cloud-based automatic virtual metrology system for semiconductor industry", Feb. 9, 2015, Robotics and Computer-Integrated Manufacturing 34 (2015) 30-43. (Year: 2015).*

Pingyu Jiang, Feng Jia, YanWang, Mei Zheng, "Real-time quality monitoring and predicting model based on error propagation networks for multistage machining processes", Oct. 31, 2011, J Intell Manuf (2014) 25:521-538 DOI 10.1007/s10845-012-0703-0. (Year: 2011).*

Martin, Patrick, Dantan, Jean-Yves, "Virtual manufacturing: prediction of work piece geometric quality by considering machine and set-up accuracy", Feb. 25, 2011, International Journal of Computer Integrated Manufacturing. (Year: 2011).*

C.L. He, W.J. Zong ,and J.J. Zhang, "Influencing factors and theoretical modeling methods of surface roughness in turning process: State-of-the-art", Dec. 6, 2017, International Journal of Machine Tools and Manufacture 129 (2018) 15-26. (Year: 2017).*

R. Kumar, and S. Chauhan, "Study on surface roughness measurement for turning of Al7075/10/SiCp and Al 7075 hybrid composites by using response surface methodology (RSM) and artificial neural networking (ANN)", Nov. 28, 2013, Measurement 65 (2015) 166-180. (Year: 2013).*

S. Neseli, S. Yaldiz, E. Türkes, "Optimization of tool geometry parameters for turning operations based on the response surface methodology", Aug. 10, 2010, Measurement 44 (2011) 580-587. (Year: 2010).*

M. Mia, and N. R. Dhar, Prediction of surface roughness in hard turning under high pressure coolant using Artificial Neural Network, Feb. 4, 2016, Measurement 92 (2016) 464-474. (Year: 2016).*

T.-L.Tsenga, U.Konadaa, and Y.Kwonb, "A novel approach to predict surface roughness in machining operations using fuzzy set theory", Apr. 9, 2015, Journal of Computational Design and Engineering 3(2016)1-13. (Year: 2015).*

Simone Pampuri et al "Multistep Virtual Metrology Approaches for Semiconductor Manufacturing Processes" 8th IEEE International Conference on Automation Science and Engineering Aug. 20-24, 2012, Seoul, Korea, pp. 91-96.

* cited by examiner

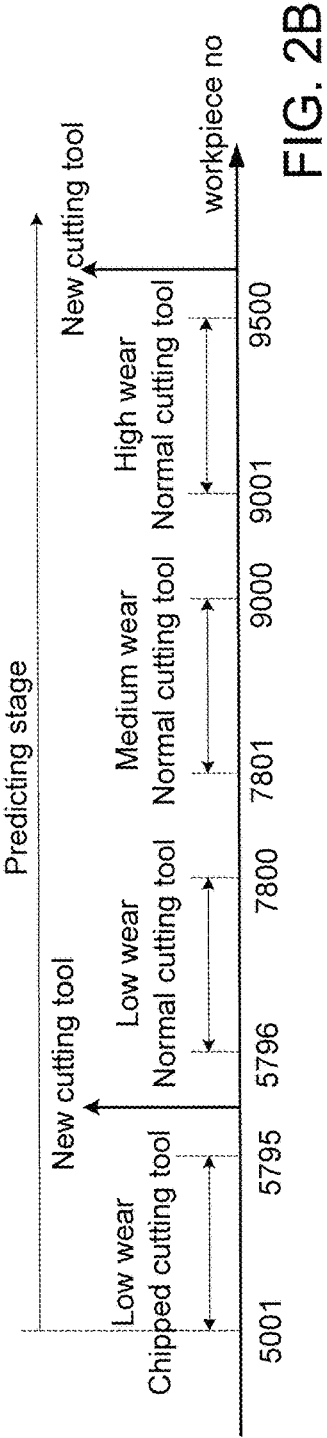

BUILDING A WORKPIECE QUALITY PREDICTION MODEL

The present application is based on, and claims priority from, Taiwan Application Serial Number 105139288, filed Nov. 29, 2016, the disclosure of which is hereby incorporated by reference herein in its entirety.

TECHNICAL FIELD

Technical field relates to a quality prediction model building method, a predicting method and an associated computer software product.

BACKGROUND

As the processing applications of workpieces become more complex, the go/no go conditions of the workpieces are determined according to a variety of workpiece qualities. Take a processing machine of a bearing as an example. The workpiece qualities of the bearing manufactured by the processing machine include the height, the inlet diameter, the internal diameter and the ditch trail of the bearing. After the workpiece (i.e., bearing) is manufactured, it is necessary to measure the height, the inlet diameter, the internal diameter and the ditch trail of the bearing. According to the result of measuring these workpiece qualities, the go/no go conditions of the workpiece could be judged.

If one or more than one workpiece quality is unqualified, the workpiece is in the no go condition. For example, if the inlet diameter, the internal diameter or the ditch trail is unqualified, the workpiece (i.e., the bearing) is in the no go condition.

If the qualities of all workpieces manufactured by the processing machine are measured, the fabricating cost is very high. In views of cost reduction, the workpiece qualities are measured by sampling inspection. According to the result of the sampling inspection, the testing worker infers whether the unsampled workpieces are in the go condition or the no go condition. However, the sampling inspection approach cannot achieve the all-round quality control purpose.

Nowadays, a virtual metrology (VM) system is provided to predict the real-time workpiece qualities, monitor the performance of the processing machine and improve the production process. Since the virtual metrology system is able to predict whether the real-time workpiece qualities are abnormal, the problem of continuously manufacturing the no-go workpieces by the processing machine could be avoided. That is, the virtual metrology system could reduce huge loss.

For example, the virtual metrology system could allow the processing machine of the bearing to continuously operate while maintaining good yield. During operation of the processing machine, the virtual metrology system continuously predicts the workpiece qualities of the manufactured workpieces according to a real-time machine parameter set. If a workpiece quality (e.g., the inlet diameter of the bearing) is unqualified and the workpiece is in the no go condition according to the prediction result, the testing worker may adjust or replace the cutting tool. Consequently, the huge loss caused by continuously operating the processing machine could be avoided.

Moreover, the conventional virtual metrology system builds a prediction model of each workpiece quality according to the machine parameter set. Basically, the conventional virtual metrology system uses an algorithm such as Lasso Regression to acquire the prediction model. Hereinafter, the way of building the prediction model in the conventional virtual metrology system will be described by taking the processing machine of bearings as an example.

Generally, the processing machine of bearings is equipped with a machine monitoring module to monitor the statuses of all components of the processing machine in real time. That is, the machine monitoring module comprises plural sensors to sense the processing machine and the components and generate the machine parameter set.

For example, the machine monitoring module generates n machine parameters $x_1 \sim x_n$. These machine parameters $x_1 \sim x_n$ are collected as a machine parameter set. The machine parameter set indicates the statuses of the processing machine and the components. The machine parameters of the machine parameter set include an environmental temperature parameter, a machine vibration parameter, a cutting force parameter, a cutting tool status parameter, a wear parameter, a cutting tool usage parameter, and so on.

The workpiece qualities of the bearing include the height, the inlet diameter, the internal diameter and the ditch trail of the bearing. That is, the four workpiece quality parameters of the bearing include a height profile $y_1$, an inlet diameter profile $y_2$, an internal diameter profile $y_3$ and a ditch trail profile $y_4$ of the bearing. These workpiece quality parameters $y_1 \sim y_4$ are collaboratively defined as a workpiece quality parameter set, indicating the workpiece qualities. In this context, the workpiece quality parameter set contains four workpiece quality parameters. It is noted that the number of the workpiece quality parameters in the workpiece quality parameter set is not restricted. For example, a thickness error of the bearing or any other appropriate workpiece quality parameter could be contained in the workpiece quality parameter set.

In the training stage of the virtual metrology system, a prediction model of a single workpiece quality is built by a specified algorithm according to the machine parameter set and a workpiece quality parameter. For example, the processing machine of bearings has to build four prediction models to predict the four workpiece quality parameters $y_1 \sim y_4$.

After the four prediction modules are built and during a predicting stage of the virtual metrology system, the four workpiece quality parameters $y_1 \sim y_4$ of the workpiece could be respectively predicted in real time according to the machine parameter set and the four prediction models. That is, the height profile $y_1$ is predicted according to the machine parameter set $x_1 \sim x_n$ and the first prediction model, the inlet error $y_2$ is predicted according to the machine parameter set $x_1 \sim x_n$ and the second prediction model, the internal diameter profile $y_3$ is predicted according to the machine parameter set $x_1 \sim x_n$ and the third prediction model, and the ditch trail profile $y_4$ is predicted according to the machine parameter set $x_1 \sim x_n$ and the fourth prediction model.

If the difference between one of the predicted workpiece qualities and the real workpiece quality is too large, it is necessary to modify the corresponding prediction model. For example, if the difference between the predicted inlet error $y_2$ and the real inlet error is too large, it is necessary to modify the second prediction model.

As mentioned above, the conventional virtual metrology system builds the prediction model corresponding to the single workpiece quality. Each prediction model is used to predict one workpiece quality only. Moreover, the prediction models corresponding to different workpiece qualities are modified individually.

SUMMARY

The disclosure is directed to a prediction model building method for use in a processing machine to manufacture a workpiece. While the workpiece is manufactured by the processing machine, a machine parameter set is generated. After the workpiece is manufactured, the workpiece is measured and a workpiece quality parameter set is generated. Then, a component status is determined according to the machine parameter set. Then, a workpiece quality prediction model in the component status is built according to the machine parameter set, the workpiece quality parameter set and the component status.

According to one embodiment, a computer software product storing an application program is provided. When the application program is executed, an electronic device with a controller performs a prediction model building method. The prediction model building method includes the following steps. Firstly, a plurality of machine parameter sets are generated while a plurality of workpieces are manufactured by a processing machine. Then, the plurality of workpieces are measured to generate a plurality of workpiece quality parameter sets after the plurality of workpieces are manufactured. Then, a plurality of component statuses are determined according to the plurality of machine parameter sets. The plurality of component statuses include a first component status and a second component status. Then, an algorithm is performed to build a first workpiece quality prediction model in the first component status according to the machine parameter sets and the workpiece quality parameter sets corresponding to the first component status.

According to one embodiment, a predicting method for use in a processing machine to manufacture a workpiece is provided. The predicting method includes the following steps. Firstly, a machine parameter set is generated while the workpiece is manufactured by the processing machine. Then, a component status is determined according to the machine parameter set. Then, a workpiece quality prediction model in the component status is determined according to the component status. Then, a workpiece quality parameter of the workpiece is predicted according to the workpiece quality prediction model in the component status and the machine parameter set.

According to one embodiment, a computer software product storing an application program is provided. When the application program is executed, an electronic device with a controller performing a predicting method. The predicting method includes the following steps. Firstly, a plurality of machine parameter sets are generated while a plurality of workpieces are manufactured by a processing machine. Then, a first component status is determined according to a first portion of the plurality of machine parameter sets, and a second component status is determined according to a second portion of the plurality of machine parameter sets. Then, a first workpiece quality prediction model in the first component status is provided, and workpiece quality parameters of the corresponding workpieces are predicted according to the first workpiece quality prediction model and the first portion of the plurality of machine parameter sets. Then, a second workpiece quality prediction model in the second component status is provided, and workpiece quality parameters of the corresponding workpieces according to the second workpiece quality prediction model and the second portion of the plurality of machine parameter sets.

BRIEF DESCRIPTION OF THE DRAWINGS

FIGS. 2A~2D schematically illustrate a method of predicting the workpiece quality parameter sets according to the machine parameter sets and the workpiece quality prediction models in the corresponding component statuses during a predicting stage of the virtual metrology system of the disclosure.

Figures 1A, 1B:
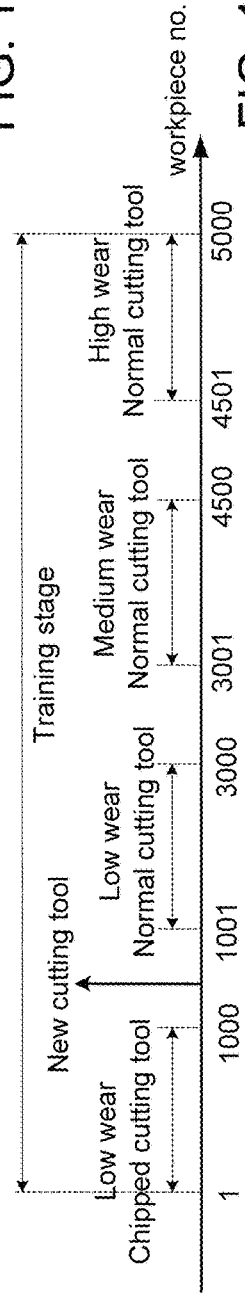
FIGS. 1A~1D schematically illustrate the methods of generating a task database and building a prediction model in a training stage of a virtual metrology system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

First Embodiment

The disclosure provides a multi-task learning based virtual metrology (VM) system. In the training stage of the virtual metrology system, a multi-task data selection system is employed to select a suitable task data from a task database according to a component status, and plural prediction models are correspondingly built. Moreover, the virtual metrology system uses multi-task learning algorithm and Lasso regression to build the prediction model. It is noted that the regression method for building the prediction model is not restricted. In some embodiments, Ridge-regression is employed to build the prediction model.

In the predicting stage the virtual metrology system, a component status is determined according to a machine parameter set and a selected prediction module is applied to the processing machine. The selected prediction module predicts a workpiece quality parameter set according to the machine parameter set. In other words, the selected prediction module could predict plural workpiece quality parameters according to the machine parameter set.

Hereinafter, a virtual metrology system, a prediction model building method and a workpiece quality predicting method will be described by taking the processing machine of bearings as an example. It is noted that the applications of the disclosure are not restricted to the processing machine of bearings and the workpiece is not restricted to the bearing. That is, the virtual metrology system, the prediction model building method and the workpiece quality predicting method of the disclosure could be applied to any other appropriate processing machine such as a semiconductor grinding machine or a semiconductor etching machine. Consequently, the product yield of the workpiece is effectively increased.

FIGS. 1A~1D schematically illustrate the methods of generating a task database and building a prediction model in a training stage of a virtual metrology system according to an embodiment of the disclosure.

Generally, a machine monitoring module of the processing machine of bearings could monitor all component statuses of the processing machine. For example, the machine monitoring module generates a machine parameter set and a workpiece quality parameter set. The machine parameter set contains n machine parameters $x_1$~$x_n$ that indicate the statuses of the processing machine and the components. The workpiece quality parameter set contains four workpiece quality parameters of the bearing. The four workpiece quality parameters of the bearing include a height profile $y_1$, an inlet diameter profile $y_2$, an internal diameter profile $y_3$ and a ditch trail profile $y_4$ of the bearing. In an embodiment, the machine parameter $x_1$ is a wear parameter, and the machine parameter $x_2$ is a chipped parameter. Moreover, the machine parameter $x_1$ and the machine parameter $x_2$ are defined as component statuses.

In case that the machine parameter $x_1$ (i.e., the wear parameter) is "a", the cutting tool is in a low wear condition. In case that the machine parameter $x_1$ (i.e., the wear parameter) is "b", the cutting tool is in a medium wear condition. In case that the machine parameter $x_1$ (i.e., the wear parameter) is "c", the cutting tool is in a high wear condition. In case that the machine parameter $x_2$ (i.e., the chipped parameter) is "i", the cutting tool is in a normal condition. In case that the machine parameter $x_2$ (i.e., the chipped parameter) is "ii", the cutting tool is in a chipped condition (or breakage condition).

For example, 5000 workpieces are sampled in the training stage. During the process of manufacturing the 5000 workpieces, the machine parameters $x_1$~$x_n$ and the measured workpiece quality parameters $y_1$~$y_4$ are recorded. Consequently, a task database is created according to the machine parameters $x_1$~$x_n$ and the measured workpiece quality parameters $y_1$~$y_4$. An example of the task database is shown in FIG. 1A.

Please refer to FIG. 1A. During the process of manufacturing the first workpiece, the machine parameters $x_1$~$x_n$ and the workpiece quality parameters $y_1$~$y_4$ are respectively: a, ii, $x_{3\_1}$~$x_{n\_1}$, $y_{1\_1}$, $y_{2\_1}$, $y_{3\_1}$ and $y_{4\_1}$. During the process of manufacturing the 1000-th workpiece, the machine parameters $x_1$~$x_n$ and the workpiece quality parameters $y_1$~$y_4$ are respectively: a, ii, $x_{3\_1000}$, $x_{n\_1000}$, $y_{1\_1000}$, $y_{2\_1000}$, $y_{3\_1000}$ and $y_{4\_1000}$. The rest may be deduced by analogy.

As mentioned above, the machine parameter $x_1$ and the machine parameter $x_2$ are defined as component statuses. Please refer to FIG. 1B. The component status for the workpieces 1~1000 is a first component status. In the first component status, the machine parameter $x_1$="a" indicates that the cutting tool is in the low wear condition and the machine parameter $x_2$="ii" indicates that the cutting tool is in the chipped condition. After the 1000-th workpiece is manufactured, the cutting tool is replaced with a new one.

The component status for the workpieces 1001~3000 is a second component status. In the second component status, the machine parameter $x_1$="a" indicates that the cutting tool is in the low wear condition and the machine parameter $x_2$="i" indicates that the cutting tool is in the normal condition. The component status for the workpieces 3001~4500 is a third component status. In the third component status, the machine parameter $x_1$="b" indicates that the cutting tool is in the medium wear condition and the machine parameter $x_2$="i" indicates that the cutting tool is in the normal condition. The component status for the workpieces 4501~5000 is a fourth component status. In the fourth component status, the machine parameter $x_1$="c" indicates that the cutting tool is in the high wear condition and the machine parameter $x_2$="i" indicates that the cutting tool is in the normal condition.

It is noted that the number of the component statuses in not restricted to four. In some other embodiments, more component statuses are defined. For example, a fifth component status and a sixth component status are further defined. In the fifth component status, the machine parameter $x_1$="b" indicates that the cutting tool is in the medium wear condition and the machine parameter $x_2$="ii" indicates that the cutting tool is in the chipped condition. In the sixth component status, the machine parameter $x_1$="c" indicates that the cutting tool is in the high wear condition and the machine parameter $x_2$="ii" indicates that the cutting tool is in the chipped condition.

Figure 1C:
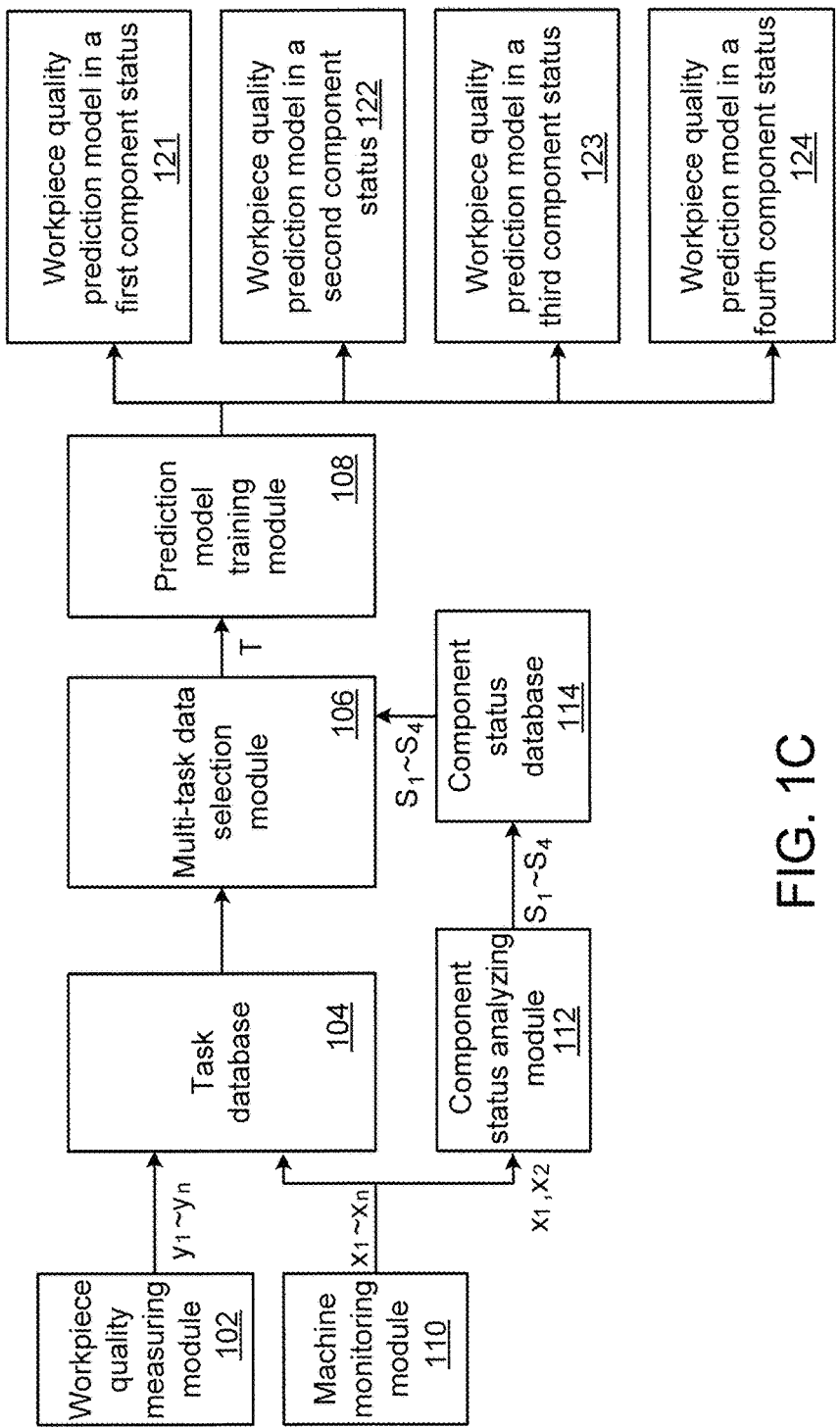

FIG. 1C schematic illustrates the architecture of implementing a prediction model building method according to an embodiment of the disclosure. The prediction model building method could be implemented by executing an application program.

During the process of manufacturing the 5000 workpieces, a workpiece quality measuring module 102 measures the workpiece qualities of all workpieces and generates the workpiece quality parameter set $y_1$~$y_4$. At the same time, the machine monitoring module 110 generates the machine parameter set $x_1$~$x_n$. Consequently, the workpiece quality parameter set $y_1$~$y_4$ and the machine parameter set $x_1$~$x_n$ are recorded in a task database 104.

A component status analyzing module 112 judges the component status of the manufactured workpiece according to the machine parameter $x_1$ (i.e., the wear parameter) and the machine parameter $x_2$ (i.e., the chipped parameter). In addition, the component status analyzing module 112 stores the component status into a component status database 114. As mentioned above, the component status for the workpieces 1~1000 is the first component status $S_1$, the component status for the workpieces 1001~3000 is the second component status $S_2$, the component status for the workpieces 3001~4500 is the third component status $S_3$, and the component status for the workpieces 4500~5000 is the fourth component status $S_4$. These component statuses $S_1$~$S_4$ are recorded in the component status database 114.

After the task database 104 and the component status database 114 are created, the component status database 114 issues the component statuses $S_1$~$S_4$ to a multi-task data selection module 106 sequentially. According to the component statuses $S_1$~$S_4$, the multi-task data selection module 106 selects a suitable task data T from the task database 104 and issues the task data T to a prediction model training module 108. Consequently, the prediction model training module 108 generates workpiece quality prediction models 121~124 in the corresponding component statuses.

When the component status database 114 issues the first component status $S_1$ to the multi-task data selection module 106, the machine parameter set $x_1$~$x_n$ and the workpiece quality parameter set $y_1$~$y_4$ corresponding to the first component status $S_1$ are selected from the task database 104 and served as the task data T by the multi-task data selection module 106. As shown in the task database 104 of FIG. 1A, the machine parameter sets $x_1$~$x_n$ and the workpiece quality parameter sets $y_1$~$y_4$ corresponding to the workpieces 1~1000 are served as the task data T. After the task data T is received by the prediction model training module 108, the prediction model training module 108 builds the workpiece quality prediction model 121 in the first component status by using Lasso regression.

When the component status database 114 issues the second component status $S_2$ to the multi-task data selection module 106, the machine parameter set $x_1$~$x_n$ and the workpiece quality parameter set $y_1$~$y_4$ corresponding to the second component status $S_2$ are selected from the task database 104 and served as the task data T by the multi-task data selection module 106. As shown in the task database 104 of FIG. 1A, the machine parameter sets $x_1$~$x_n$ and the workpiece quality parameter sets $y_1$~$y_4$ corresponding to the workpieces 1001~3000 are served as the task data T. After the task data T is received by the prediction model training module 108, the prediction model training module 108 builds the workpiece quality prediction model 122 in the second component status by using Lasso regression.

The ways of building the workpiece quality prediction model 123 in the third component status and the workpiece quality prediction model 124 in the fourth component status are similar to the above ways, and are not redundantly described herein.

Figure 1D:
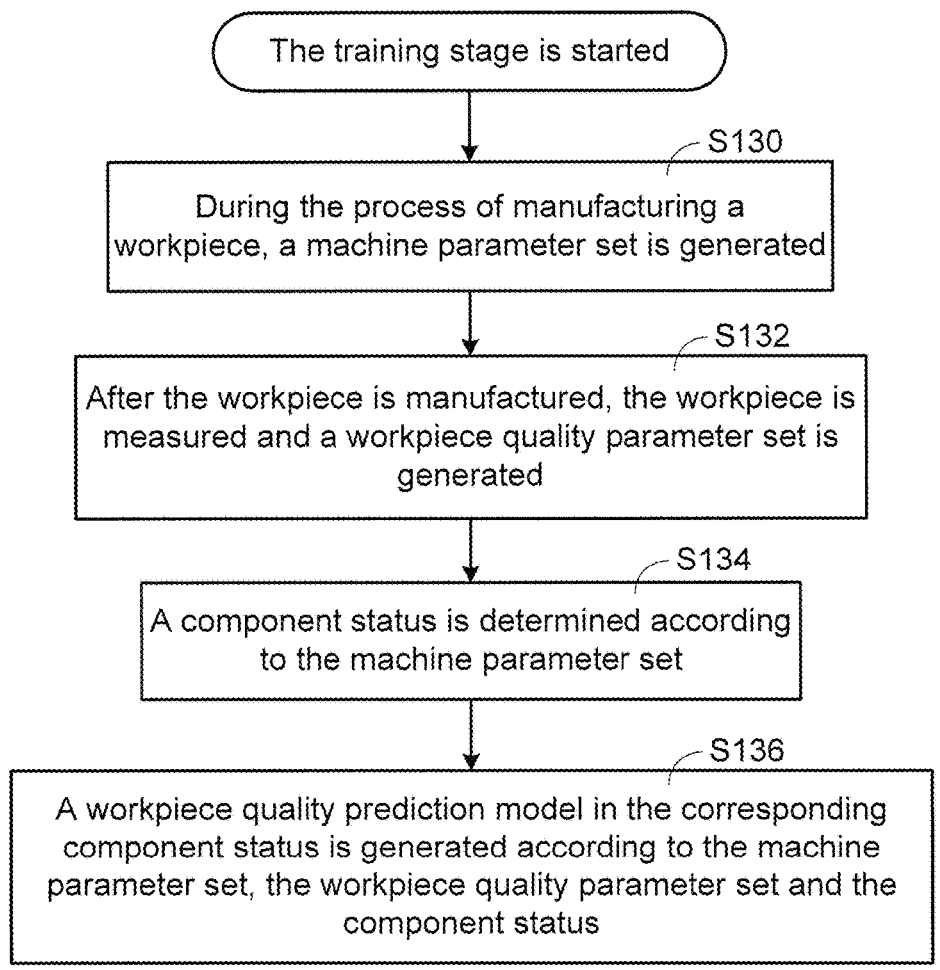

FIG. 1D schematic illustrates a flowchart of a prediction model building method according to an embodiment of the disclosure.

After the training stage is started and during the process of manufacturing a workpiece, a machine parameter set is generated (Step S130). After the workpiece is manufactured, the workpiece is measured and a workpiece quality parameter set is generated (Step S132). Then, a component status is determined according to the machine parameter set (Step S134). Then, a workpiece quality prediction model in the corresponding component status is generated according to the machine parameter set, the workpiece quality parameter set and the component status (Step S136).

The prediction model building method of the disclosure could be applied to a computer software product that stores an application program. When a controller of the computer software product executes the application program, the prediction model is built.

In the flowchart of FIG. 1D, one workpiece is sampled, and the workpiece quality prediction model in the corresponding component status is generated according to the machine parameter set, the workpiece quality parameter set and the component status.

The above operating principles could be applied to manufacture 5000 sampled workpieces. As shown in FIG. 1C, 5000 workpieces are sampled, and the workpiece quality prediction models in the corresponding component statuses are generated according to the machine parameter sets, the workpiece quality parameter sets and the component statuses.

In the training stage of the conventional virtual metrology system, a prediction model of a single workpiece quality is built according to the machine parameter set only. In the training stage of the virtual metrology system of the disclosure, the prediction models of all workpiece quality parameters are built according to the machine parameter sets and the workpiece quality parameter sets.

In accordance with the technology of the disclosure, the machine parameter set and the workpiece quality parameter sets are combined in the training stage to build the prediction models of all workpiece quality parameters. Consequently, during the operation of the processing machine, only one prediction model is able to predict all workpiece qualities of the workpiece.

The workpiece qualities (e.g., the height, inlet diameter, the ditch trail and the internal diameter of the bearing) are correlated with the status of the cutting tool. In accordance with a feature of the disclosure, the parameters associated with the cutting tool are defined as the component statuses, and different workpiece qualities are considered as different tasks.

Moreover, by using the multi-task learning based virtual metrology system of the disclosure, the commonality between plural tasks could be acquired. Due to the commonality, the mean absolute error in the training stage is reduced, and the built prediction model is more accurate. Consequently, the accuracy of judging the go/no go conditions of the workpiece is enhanced.

After the training stage is completed and the workpiece quality prediction models in the corresponding component statuses are generated, the virtual metrology system enters the predicting stage. In the predicting stage, it is not necessary to use the workpiece quality measuring module 102 to measure the workpiece qualities. Whereas, the workpiece quality prediction models are used for predicting the workpiece qualities.

FIGS. 2A~2D schematically illustrate a method of predicting the workpiece quality parameter sets according to the machine parameter sets and the workpiece quality prediction models in the corresponding component statuses during a predicting stage of the virtual metrology system of the disclosure.

After the training stage is completed, the workpiece quality prediction models 121~124 in the four component statuses are built. Then, the virtual metrology system enters the predicting stage to predict the workpiece qualities of the workpieces. In the following example, the predicting stage is started after the 5001-th workpiece is manufactured.

Similarly, during the process of manufacturing the workpieces (e.g., the workpieces 5001~9500) in the predicting stage, all machine parameter sets $x_1$~$x_n$ are recorded and stored in the task database. An example of the task database is shown in FIG. 2A. In comparison with the training stage, the task database of the predicting stage only contains the machine parameter set. Since it is not necessary to measure the workpiece quality parameter set in the predicting stage, the task database does not store the workpiece quality parameter set.

Please refer to FIG. 2A. During the process of manufacturing the 5001-th workpiece, the machine parameters $x_1$~$x_n$ are respectively: a, ii, and $x_{3\_5001}$~$x_{n\_5001}$. During the process of manufacturing the 5795-th workpiece, the machine parameters $x_1$~$x_n$ are respectively: a, ii and $x_{3\_5795}$~$x_{n\_5795}$. The rest may be deduced by analogy.

As mentioned above, the machine parameter $x_1$ and the machine parameter $x_2$ are defined as component statuses. Please refer to FIG. 2B. The component status for the workpieces 5001~5795 is the first component status. In the first component status, the machine parameter $x_1$="a" indicates that the cutting tool is in the low wear condition and the machine parameter $x_2$="ii" indicates that the cutting tool is in the chipped condition. After the 5795-th workpiece is manufactured, the cutting tool is replaced with a new one.

The component status for the workpieces 5796~7800 is the second component status. In the second component status, the machine parameter $x_1$="a" indicates that the cutting tool is in the low wear condition and the machine parameter $x_2$="i" indicates that the cutting tool is in the normal condition. The component status for the workpieces 7801~9000 is a third component status. In the third component status, the machine parameter $x_1$="b" indicates that the cutting tool is in the medium wear condition and the machine parameter $x_2$="i" indicates that the cutting tool is in the normal condition. The component status for the workpieces 9001~9500 is the fourth component status. In the fourth component status, the machine parameter $x_1$="c" indicates that the cutting tool is in the high wear condition and the machine parameter $x_2$="i" indicates that the cutting tool is in the normal condition.

Figure 2C:
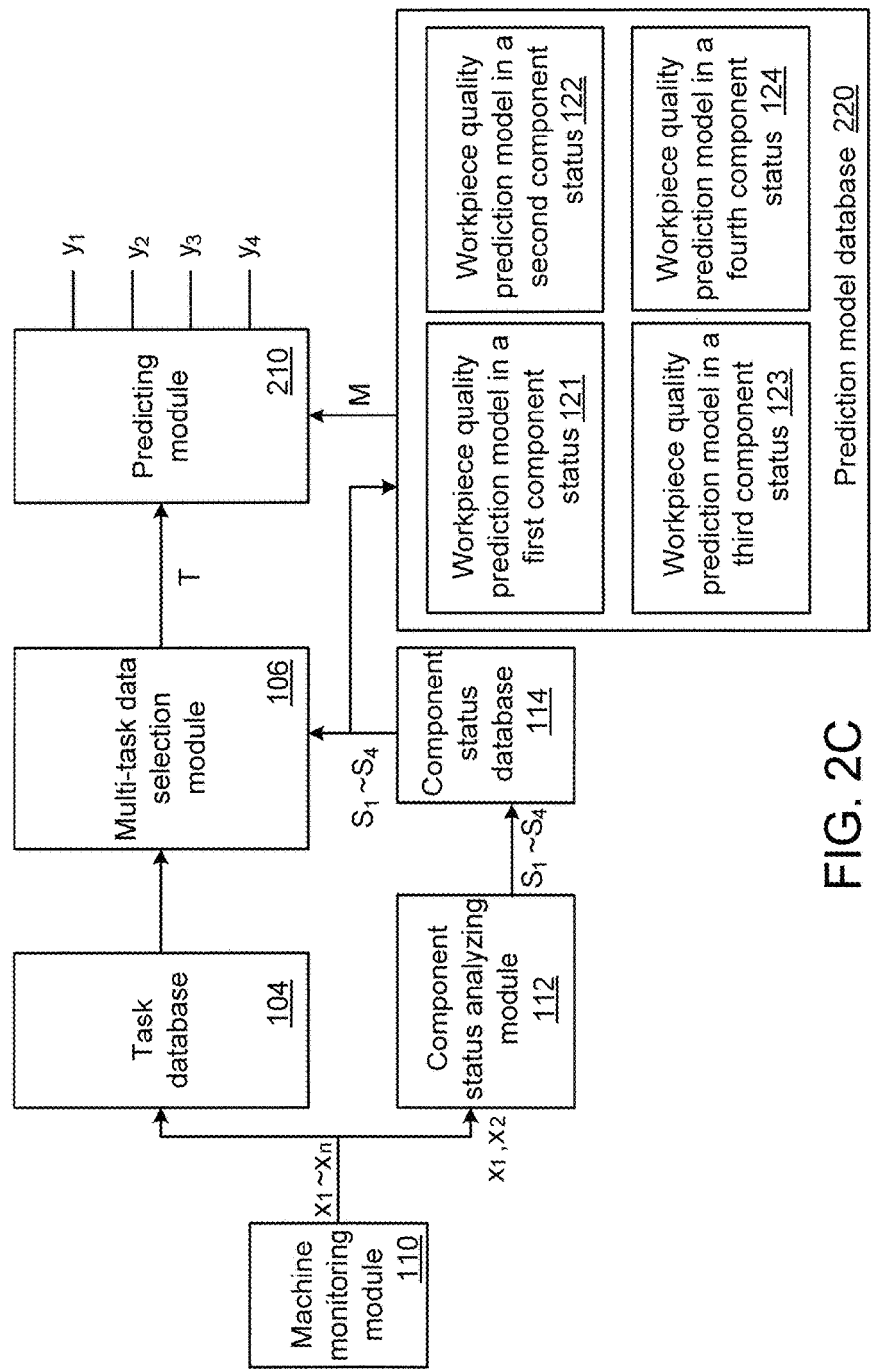

FIG. 2C schematic illustrates the architecture of implementing a method of predicting the workpiece quality parameter set according to an embodiment of the disclosure. The predicting method could be implemented by executing an application program. In the predicting stage, the machine monitoring module 110 generates the machine parameter sets $x_1$~$x_n$ corresponding to all workpieces. In addition, the machine parameter sets $x_1$~$x_n$ are recorded in a task database 104.

Moreover, the component status analyzing module 112 judges the component status of the manufactured workpiece according to the machine parameter $x_1$ (i.e., the wear parameter) and the machine parameter $x_2$ (i.e., the chipped parameter) only. In addition, the component status analyzing module 112 stores the component status into the component status database 114.

As mentioned above, the component status for the workpieces 5001~5795 is the first component status $S_1$, the component status for the workpieces 5796~7800 is the second component status $S_2$, the component status for the workpieces 7801~9000 is the third component status $S_3$, and the component status for the workpieces 9001~9500 is the fourth component status $S_4$. These component statuses $S_1$~$S_4$ are recorded in the component status database 114.

After the task database 104 and the component status database 114 are created, the component status database 114 issues the component statuses $S_1$~$S_4$ to the multi-task data selection module 106 and a prediction model database 220 sequentially.

According to the component statuses $S_1$~$S_4$, the multi-task data selection module 106 selects a suitable task data T from the task database 104 and issues the task data T to a predicting module 210. Consequently, the predicting module 210 provides the workpiece quality prediction model in the corresponding component status to the predicting module 210. After the predicting module 210 receives the workpiece quality prediction model in the corresponding component status and the task data T, the predicting module 210 predicts the workpiece quality parameter set $y_1$~$y_4$.

For example, if the component status database 114 issues the first component status $S_1$ to the multi-task data selection module 106 and the prediction model database 220, the machine parameter sets $x_1$~$x_n$ corresponding to the first component status $S_1$ are selected from the task database 104 and served as the task data T by the multi-task data selection module 106. In addition, the workpiece quality prediction model 121 in the first component status is provided from the prediction model database 220 to the predicting module 210.

As shown in the task database 104 of FIG. 2A, the machine parameter sets $x_1$~$x_n$ corresponding to the workpieces 5001~5795 are served as the task data T. After the task data T is received by the predicting module 210, the predicting module 210 predicts the workpiece quality parameter sets corresponding to the workpieces 5001~5795 according to the workpiece quality prediction model 121 in the first component status.

Similarly, if the component status database 114 issues the second component status $S_2$ to the multi-task data selection module 106 and the prediction model database 220, the machine parameter set $x_1$~$x_n$ corresponding to the second component status $S_2$ are selected from the task database 104 and served as the task data T by the multi-task data selection module 106. In addition, the workpiece quality prediction model 122 in the second component status is provided from the prediction model database 220 to the predicting module 210.

As shown in the task database 104 of FIG. 2A, the machine parameter sets $x_1$~$x_n$ corresponding to the workpieces 5796~7800 are served as the task data T. After the task data T is received by the predicting module 210, the predicting module 210 predicts the workpiece quality parameter sets corresponding to the workpieces 5796~7800 according to the workpiece quality prediction model 122 in the second component status.

Similarly, the predicting module 210 predicts the workpiece quality parameter sets corresponding to the workpieces 7801~9000 according to the workpiece quality prediction model 123 in the third component status. Similarly, the predicting module 210 predicts the workpiece quality parameter sets corresponding to the workpieces 9001~9500 according to the workpiece quality prediction model 124 in the fourth component status. The detailed descriptions thereof are omitted herein.

Figure 2D:
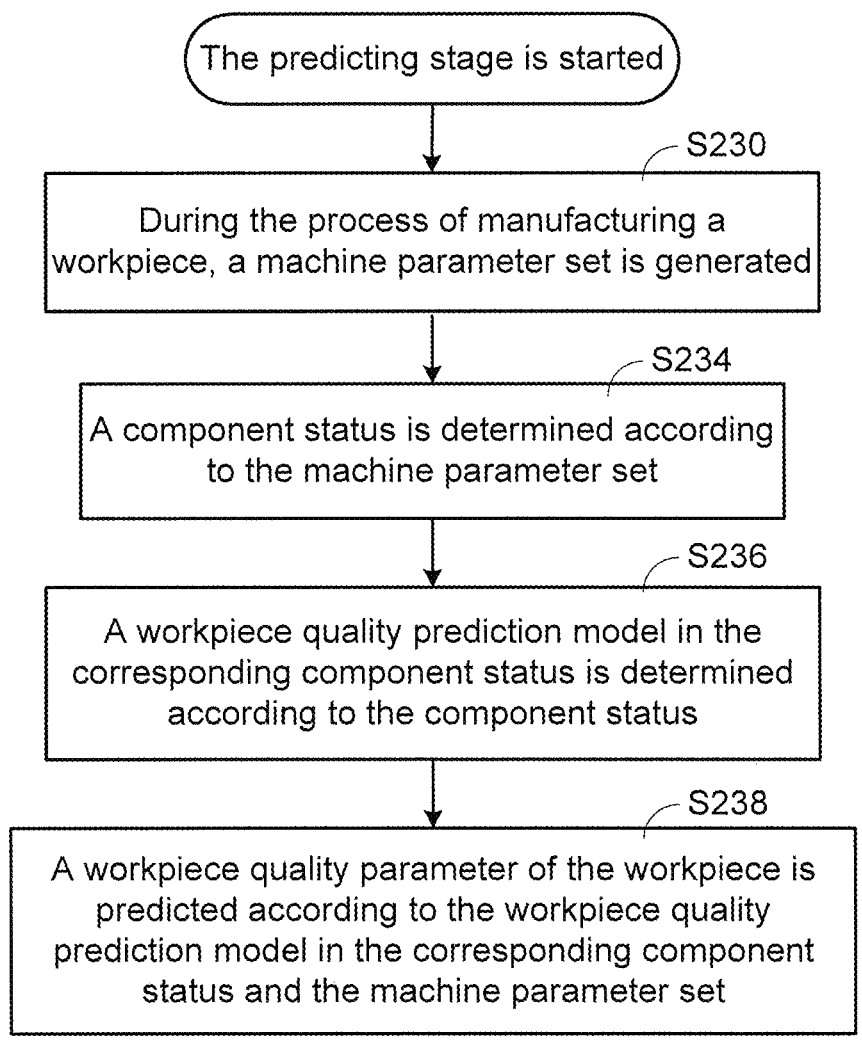

FIG. 2D schematic illustrates a flowchart of a method for predicting the workpiece quality parameters according to an embodiment of the disclosure.

After the predicting stage is started and during the process of manufacturing a workpiece, a machine parameter set is generated (Step S320). Then, a component status is determined according to the machine parameter set (Step S234). Then, a workpiece quality prediction model in the corresponding component status is determined according to the component status (Step S236). Then, a workpiece quality parameter of the workpiece is predicted according to the workpiece quality prediction model in the corresponding component status and the machine parameter set (Step S238).

The above predicting method could be applied to a computer software product that stores an application program. When a controller of the computer software product executes the application program, the workpiece qualities of the workpiece could be predicted.

In the flowchart of FIG. 2D, one workpiece is sampled, and the workpiece quality parameter set corresponding to the component status is predicted according to the workpiece quality prediction model in the corresponding component status and the machine parameter set.

The above operating principles could be applied to manufacture plural workpieces. As shown in FIG. 2C, the workpiece quality parameter sets of the workpieces are predicted according to the machine parameter sets and the workpiece quality prediction models in the corresponding component statuses.

From the above descriptions, the virtual metrology system of the disclosure is capable of predicting the workpiece parameter set according to the workpiece quality prediction model in the corresponding component status and the machine parameter set while the processing machine is in the predicting stage.

The data of some workpiece quality parameter sets predicted by the virtual metrology system of the disclosure according to different workpiece quality prediction models in the corresponding component statuses are listed in the following Table a.

TABLE a

| | | | | | |
|---|---|---|---|---|---|
| (unit: ×0.01 mm) | | | | | |
| Sampled workpiece | Predicted workpiece | Height | Inlet diameter | Internal diameter | Ditch trail |
| 1~1000 | 5000~5795 | 1.44 | 2.11 | 1.86 | 3.44 |
| 1001~3000 | 5796~7800 | 1.18 | 1.01 | 1.05 | 0.82 |
| 3001~4500 | 7801~9000 | 1.38 | 1.79 | 0.91 | 1.16 |
| 4500~5000 | 9001~9500 | 0.32 | 0.81 | 0.76 | 0.99 |

The workpiece quality parameter sets of the workpieces 5000~5790 are predicted according to the workpiece quality prediction model 121 in the first component status, which is built according to the machine parameter sets and the workpiece quality parameters of the sampled workpieces 1~1000. The prediction result shown that the height profile $y_1$, the inlet diameter profile $y_2$, the internal diameter profile $y_3$ and the ditch trail profile $y_4$ are 0.0144 mm, 0.0211 mm, 0.0186 mm and 0.0344 mm, respectively.

The workpiece quality parameter sets of the workpieces 5795~7800 are predicted according to the workpiece quality prediction model 122 in the second component status, which is built according to the machine parameter sets and the workpiece quality parameters of the sampled workpieces 1001~3000. The workpiece quality parameter sets of the workpieces 7801~9000 are predicted according to the workpiece quality prediction model 123 in the third component status, which is built according to the machine parameter sets and the workpiece quality parameters of the sampled workpieces 3001~4500. The workpiece quality parameter sets of the workpieces 9001~9500 are predicted according to the workpiece quality prediction model 124 in the fourth component status, which is built according to the machine parameter sets and the workpiece quality parameters of the sampled workpieces 4501~5000.

The data of some workpiece quality parameter sets predicted by a single prediction model without taking the component statuses into consideration are listed in the following Table b:

TABLE b

| | | | | | |
|---|---|---|---|---|---|
| | (unit: 0.01 mm) | | | | |
| Sampled workpiece | Predicted workpiece | Height | Inlet diameter | Internal diameter | Ditch trail |
| 1~5000 | 5000~5795 | 1.47 | 3.51 | 4.49 | 4.20 |
| | 5796~7800 | 0.35 | 2.20 | 2.10 | 2.42 |
| | 7801~9000 | 0.94 | 2.05 | 1.36 | 1.66 |
| | 9001~9500 | 1.03 | 1.21 | 1.52 | 1.57 |

The workpiece quality parameter sets of the workpieces 5000~5795, 5796~7800, 7801~9000 and 9001~9500 are predicted according to a single prediction model, which is built according to the machine parameter sets and the workpiece quality parameters of the sampled workpieces 1~5000.

According to the contents of Table a, the virtual metrology system of the disclosure has better prediction results.

The data of the comparison between the prediction results of the present virtual metrology system and the conventional virtual metrology system are listed in the following Table c.

TABLE c

| Algorithm | Height | Inlet diameter | Internal diameter | Ditch trail |
|---|---|---|---|---|
| Lasso | 0.0071 mm | 0.0097 mm | 0.0087 mm | 0.0091 mm |
| Multi-task Lasso | 0.0058 mm | 0.0091 mm | 0.0081 mm | 0.0084 mm |
| Improvement (%) | 18.3 | 6.18 | 6.89 | 7.69 |

As shown in Table c, the bearing height predicted through Lasso regression according to the prediction model of the conventional virtual metrology system has an error of 0.0071 mm with respect to the measured value of the bearing height. Whereas, the bearing height predicted through multi-task Lasso regression according to the prediction model of the present virtual metrology system has an error of 0.0058 mm with respect to the measured value of the bearing height.

Obviously, the improvement in height accuracy by the present virtual metrology system is 18.3%. The improvements in other workpiece qualities are also satisfied.

Optionally, the virtual metrology system of the disclosure in the predicting stage of FIG. 2C further comprises an updating module. If the workpiece quality parameter set predicted according to the workpiece quality prediction model of the virtual metrology system in the corresponding component status has an error higher than a threshold value with respect to the actual workpiece quality parameter set, the updating module performs an updating operation to modify the workpiece quality prediction model of the virtual metrology system in the corresponding component status.

For example, if the workpiece quality parameter set predicted according to the workpiece quality prediction model 124 in the fourth component status has an error higher than the threshold value with respect to the actual workpiece quality parameter set, the updating module performs the updating operation to modify the workpiece quality prediction model of the virtual metrology system in the fourth component status.

From the above descriptions, the disclosure provides a prediction model building method of a virtual metrology system and a predicting method. By using the multi-task learning based virtual metrology system, the commonality between plural tasks could be acquired. Due to the commonality, the mean absolute error in the training stage is reduced, and the built prediction model is more accurate. Consequently, the accuracy of judging the go/no go conditions of the workpiece is enhanced.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A prediction model building method for use in a processing machine comprising a plurality of components to manufacture a first workpiece and a second workpiece, the prediction model building method comprising steps of:
   generating a machine parameter set by monitoring statuses of the plurality of components while the first workpiece is manufactured by the processing machine in a training stage;
   measuring the first workpiece to generate a workpiece quality parameter set after the first workpiece is manufactured;
   determining a component status to be used by the processing machine in a predicting stage according to the machine parameter set; and
   building a workpiece quality prediction model in the component status to predict quality of the second workpiece to be manufactured in the predicting stage according to the machine parameter set, the workpiece quality parameter set and the component status, wherein the statuses of the plurality of components are monitored in the predicting stage.

2. The prediction model building method as claimed in claim 1, wherein a machine monitoring module of the processing machine monitors the statuses of the plurality of components during the training stage and accordingly generates a plurality of machine parameters and the plurality of machine parameters are combined as the machine parameter set.

3. The prediction model building method as claimed in claim 2, wherein after a plurality of workpiece qualities of the first workpiece are measured by a workpiece quality measuring module of the processing machine, a plurality of workpiece quality parameters are generated and combined as the workpiece quality parameter set by the workpiece quality measuring module.

4. The prediction model building method as claimed in claim 1, further comprising a step of performing an algorithm before the predicting stage to build the workpiece quality prediction model in the component status according to the machine parameter set and the workpiece quality parameter set.

5. A computer software product storing an application program, an electronic device with a controller performing a prediction model building method when the application program is executed, the prediction model building method comprising steps of:
- generating a plurality of machine parameter sets by monitoring statuses of a plurality of components in a processing machine while a plurality of first workpieces are manufactured by the processing machine in a training stage;
- measuring the plurality of first workpieces to generate a plurality of workpiece quality parameter sets after the plurality of first workpieces are manufactured;
- determining a plurality of component statuses to be used by the processing machine in a predicting stage according to the plurality of machine parameter sets, wherein the plurality of component statuses include a first component status and a second component status; and
- performing an algorithm to build a first workpiece quality prediction model in the first component status according to the machine parameter sets and the workpiece quality parameter sets corresponding to the first component status, wherein the first workpiece quality prediction model predicts quality of a plurality of second workpieces to be manufactured by the processing machine in the predicting stage, and the statuses of the plurality of components are monitored in the predicting stage.

6. The computer software product as claimed in claim 5, wherein the prediction model building method further comprises a step of performing the algorithm to build a second workpiece quality prediction model in the second component status according to the machine parameter sets and the workpiece quality parameter sets corresponding to the second component status.

7. The computer software product as claimed in claim 5, further comprising a machine monitoring module, wherein while the plurality of first workpieces are manufactured, a plurality of machine parameters are generated and combined as the machine parameter set corresponding to the plurality of first workpieces by the machine monitoring module.

8. The computer software product as claimed in claim 7, further comprising a workpiece quality measuring module, wherein after a plurality of workpiece qualities of the plurality of first workpieces are measured by the workpiece quality measuring module, a plurality of workpiece quality parameters are generated and combined as the workpiece quality parameter set corresponding to the plurality of first workpieces by the workpiece quality measuring module.

9. The computer software product as claimed in claim 5, further comprising a task database, wherein the machine parameter sets and the workpiece quality parameter sets are stored in the task database.

10. The computer software product as claimed in claim 9, further comprising a component status analyzing module, wherein the component status analyzing module receives the machine parameter sets and determines the first component status or the second component status according to the machine parameter sets.

11. The computer software product as claimed in claim 10, further comprising:
- a multi-task data selection module, wherein according to the first component status, the multi-task data selection module selects the machine parameter sets and the workpiece quality parameter sets corresponding to the first component status from the task database; and
- a prediction model training module for performing the algorithm to build the first workpiece quality prediction model.

12. A predicting method for use in a processing machine comprising a plurality of components to manufacture a first workpiece and a second workpiece, the predicting method comprising steps of:
- generating a machine parameter set by monitoring statuses of the plurality of components while the first workpiece is manufactured by the processing machine in a training stage;
- determining a component status to be used by the processing machine in a predicting stage according to the machine parameter set;
- determining a workpiece quality prediction model in the component status according to the component status;
- monitoring the statuses of the plurality of components in the predicting stage; and
- predicting a workpiece quality parameter of the second workpiece to be manufactured by the processing machine in the predicting stage according to the statuses of the plurality of components monitored in the predicting stage, the workpiece quality prediction model in the component status and the machine parameter set.

13. The predicting method as claimed in claim 12, wherein a machine monitoring module of the processing machine generates a plurality of machine parameters and combining the plurality of machine parameters as the machine parameter set.

14. A computer software product storing an application program, an electronic device with a controller performing a predicting method when the application program is executed, the predicting method comprising steps of:
- generating a plurality of machine parameter sets by monitoring statuses of a plurality of components of a processing machine while a plurality of first workpieces are manufactured by the processing machine in a training stage;
- determining a first component status according to a first portion of the plurality of machine parameter sets and determining a second component status according to a second portion of the plurality of machine parameter sets, wherein the first and the second component statuses are monitored and used by the processing machine in a predicting stage;
- providing a first workpiece quality prediction model in the first component status in the predicting stage, and predicting workpiece quality parameters of a plurality of second workpieces corresponding to the first component status according to the first workpiece quality prediction model and the first portion of the plurality of machine parameter sets, wherein the first workpiece quality prediction model predicts qualities of the plurality of second workpieces; and
- providing a second workpiece quality prediction model in the second component status in the predicting stage, and predicting workpiece quality parameters of a plurality of third workpieces according to the second workpiece quality prediction model and the second portion of the plurality of machine parameter sets, wherein the second workpiece quality prediction model predicts qualities of the plurality of third workpieces.

15. The computer software product as claimed in claim 14, further comprising a machine monitoring module, wherein while the plurality of first workpieces are manufactured, a plurality of machine parameters are generated and combined as the machine parameter set corresponding to the plurality of first workpieces by the machine monitoring module.

16. The computer software product as claimed in claim 14, further comprising a task database, wherein the machine parameter sets are stored in the task database.

17. The computer software product as claimed in claim 15, further comprising a component status analyzing module, wherein the component status analyzing module receives the machine parameter sets and determines the first component status according to the first portion of the plurality of machine parameter sets or the second component status according to the second portion of the plurality of machine parameter sets.

18. The computer software product as claimed in claim 16, further comprising:

a multi-task data selection module, wherein according to the first component status, the multi-task data selection module selects the first portion of the plurality of machine parameter sets from the task database;

a prediction model database, wherein the first workpiece quality prediction model in the first component status and the second workpiece quality prediction model in the second component status are stored in the prediction model database, and the prediction model database provides the first workpiece quality prediction model according to the first component status; and a predicting module for predicting a plurality of workpiece quality parameter sets according to the first workpiece quality prediction model and the first portion of the plurality of machine parameter sets.

19. The computer software product as claimed in claim 18, further comprising an updating module, wherein if one of the plurality of workpiece quality parameter sets predicted according to the first workpiece quality prediction model has an error higher than a threshold value with respect to an actual workpiece quality parameter set, the updating module performs an updating operation to modify the first workpiece quality prediction model.

* * * * *